US009567876B2

United States Patent
Stewart et al.

(10) Patent No.: US 9,567,876 B2
(45) Date of Patent: Feb. 14, 2017

(54) REACTOR SYSTEM AND SOLID FUEL COMPOSITE THEREFOR

(75) Inventors: Albert E. Stewart, Canoga Park, CA (US); Ganesan Subbaraman, Canoga Park, CA (US); Jeffrey A. Mays, Canoga Park, CA (US); James A. Hartung, Canoga Park, CA (US)

(73) Assignee: Gas Technology Institute, Des Plaines, IL (US)

( * ) Notice: Subject to any disclaimer, the term of this patent is extended or adjusted under 35 U.S.C. 154(b) by 1111 days.

(21) Appl. No.: 12/794,218

(22) Filed: Jun. 4, 2010

(65) Prior Publication Data
US 2010/0307389 A1    Dec. 9, 2010

Related U.S. Application Data

(60) Provisional application No. 61/184,367, filed on Jun. 5, 2009, provisional application No. 61/184,384, filed
(Continued)

(51) Int. Cl.
| | |
|---|---|
| *F01K 9/02* | (2006.01) |
| *F01K 7/32* | (2006.01) |
| *F01K 25/10* | (2006.01) |
| *F01K 23/06* | (2006.01) |
| *F22B 31/00* | (2006.01) |
| *F23C 10/00* | (2006.01) |
| *F23C 10/20* | (2006.01) |

(Continued)

(52) U.S. Cl.
CPC .............. *F01K 25/103* (2013.01); *F01K 7/32* (2013.01); *F01K 23/062* (2013.01); *F02C 1/04* (2013.01); *F22B 31/0023* (2013.01); *F23C 10/005* (2013.01); *F23C 10/20* (2013.01); *F28D 7/087* (2013.01); *F28D 13/00* (2013.01); *F23C 2900/10001* (2013.01); *Y02E 20/12* (2013.01)

(58) Field of Classification Search
None
See application file for complete search history.

(56) References Cited

U.S. PATENT DOCUMENTS 3,732,922 A * 5/1973 Pouderoux .................. 165/158
3,768,554 A * 10/1973 Stahl ......................... 165/134.1
(Continued)

FOREIGN PATENT DOCUMENTS

| EP | 2218978 | * | 8/2010 |
|---|---|---|---|
| GB | 2217828 | * | 1/1989 |

(Continued)

OTHER PUBLICATIONS

Merriam-Webster online (www.merriam-webster.com/dictionary/zone) (2012).*

*Primary Examiner* — Melvin C Mayes
*Assistant Examiner* — Sheng H Davis
(74) *Attorney, Agent, or Firm* — Pauley Erickson & Kottis (57) ABSTRACT

A reactor system includes a fluidized-bed. A fuel and a sulfur absorbent material are eluted through the fluidized-bed. The reactor system may include a heat exchanger having a heat-exchanging portion within a heating zone of the reactor that is hermetically sealed from the heating zone. The reactor may include loose particles of an inert bed material for forming the fluidized-bed. A feed system may be provided to inject a solid fuel composite that includes a mixture of a solid, carbonaceous fuel and a solid reagent into the reactor.

22 Claims, 7 Drawing Sheets

Related U.S. Application Data on Jun. 5, 2009, provisional application No. 61/184,382, filed on Jun. 5, 2009, provisional application No. 61/184,383, filed on Jun. 5, 2009.

(51) Int. Cl.
 *F28D 7/08* (2006.01)
 *F28D 13/00* (2006.01)
 *F02C 1/04* (2006.01)

(56) References Cited

U.S. PATENT DOCUMENTS

| | | | |
|---|---|---|---|
| 3,971,211 A * | 7/1976 | Wethe et al. | 60/39.181 |
| 4,424,765 A * | 1/1984 | Strohmeyer, Jr. | 122/4 D |
| 4,455,969 A * | 6/1984 | Barker | 122/4 D |
| 4,499,944 A * | 2/1985 | Komakine | 165/104.16 |
| 4,682,567 A * | 7/1987 | Garcia-Mallol | F22B 31/0038 110/245 |
| 4,709,755 A * | 12/1987 | Gentry | F22B 37/205 165/160 |
| 4,765,143 A * | 8/1988 | Crawford et al. | 60/671 |
| 5,269,371 A * | 12/1993 | Boula | F22B 37/206 122/510 |
| 5,589,602 A * | 12/1996 | Smith et al. | 585/671 |
| 5,601,788 A * | 2/1997 | Hyppanen et al. | 422/147 |
| 6,206,088 B1* | 3/2001 | Semedard et al. | 165/104.16 |
| 2004/0020206 A1* | 2/2004 | Sullivan et al. | 60/670 |
| 2009/0120629 A1* | 5/2009 | Ashe | 165/181 |
| 2009/0139702 A1* | 6/2009 | Hogan | 165/168 |
| 2009/0151917 A1* | 6/2009 | Meschke et al. | 165/168 |
| 2010/0024421 A1* | 2/2010 | Litwin et al. | 60/641.8 |
| 2011/0180245 A1* | 7/2011 | Obana | F28D 7/0041 165/181 |
| 2011/0289921 A1* | 12/2011 | Dethier | F22B 1/006 60/641.8 |

FOREIGN PATENT DOCUMENTS

| | | | |
|---|---|---|---|
| JP | 01315623 | * | 4/1989 |
| JP | 401315623 | * | 4/1989 |
| JP | 1730916 | * | 2/2006 |

* cited by examiner

REACTOR SYSTEM AND SOLID FUEL COMPOSITE THEREFOR

RELATED APPLICATIONS

This application claims priority to U.S. Provisional Application No. 61/184,367, filed Jun. 5, 2009, U.S. Provisional Application No. 61/184,384, filed on Jun. 5, 2009, U.S. Provisional Application No. 61/184,382, filed on Jun. 5, 2009, and U.S. Provisional Application No. 61/184,383, all incorporated herein by reference.

BACKGROUND

This disclosure generally relates to reactor systems. As an example, gasification reactors may be used for combustion of carbon-based fuels to generate electrical power. Typically, a gasification reactor combusts a carbonaceous fuel, such as natural gas or solid coal product, that is mixed with an oxidizer. The resulting hot combustion products may be used to drive a turbine that is mechanically coupled to an electric generator.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
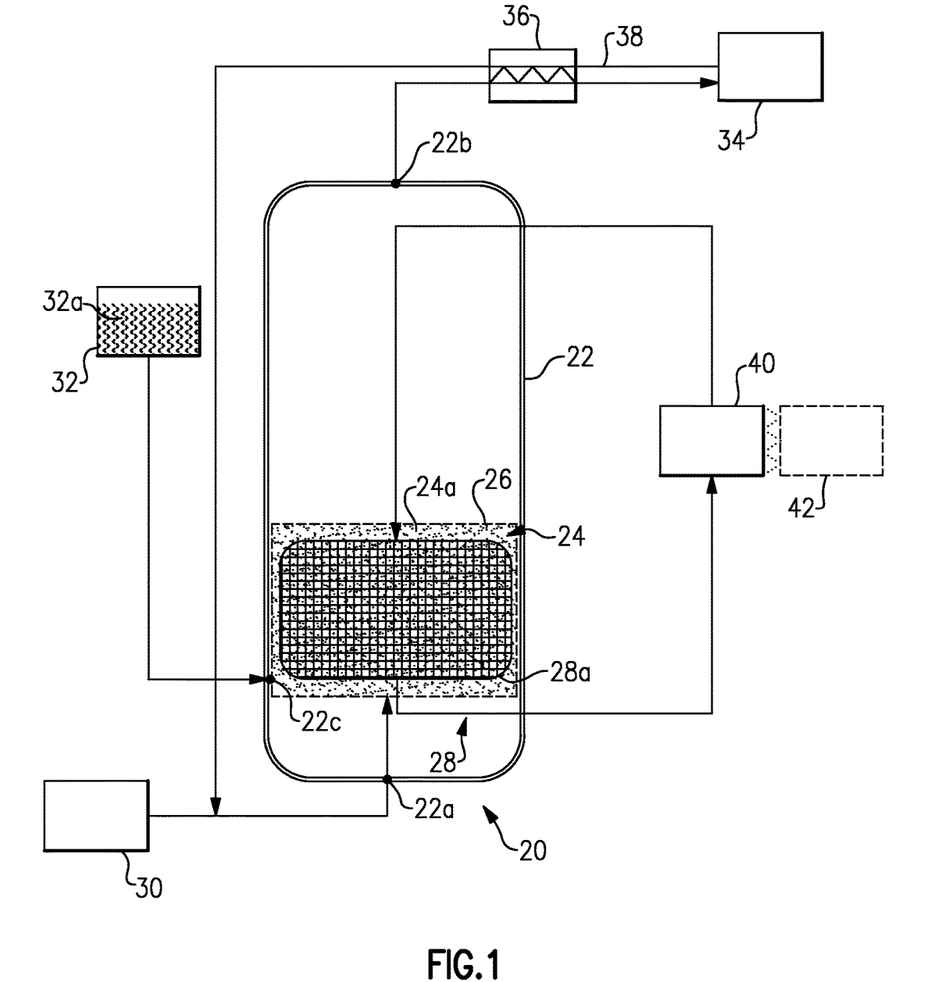
FIG. 1 illustrates an example reactor system.

FIG. 1 illustrates selected portions of an example reactor system 20 that may be used for generating a desired gas (e.g., carbon dioxide), generating electrical power, or other desired purpose. As will be evident from this disclosure, the reactor system 20 may be configured to be a zero emission system and therefore facilitates avoiding discharge of product gases or other substances into the atmosphere.

In the illustrated example, the reactor system 20 includes a reactor 22 (i.e., a heat source) that is operable to form a fluidized bed 24 within a heating zone 26 within the reactor 22. The fluidized bed 24 may be formed from loose particles of an inert bed material 24a, for example. The reactor system 20 also includes a heat exchanger 28 having a heat-exchanging portion 28a within the heating zone 26. The heat-exchanging portion 28a is hermetically sealed from the heating zone 26 such that gases within the heating zone 26 cannot substantially enter into the heat-exchanging portion 28a and the heat-exchanging fluid within the heat exchanger 28 cannot substantially escape into the reactor 22.

The reactor system 20 may also include other components that facilitate operation of the reactor system 20. For example, the reactor system 20 may include an oxygen supply 30, such as an air separation unit, for providing oxygen gas into the heating zone 26, and a feed supply 32 for providing fuel to the heating zone 26. The feed supply 32 may include a solid fuel composite 32a that is injected into the heating zone 26 for reaction with the oxygen from the oxygen supply 30.

The solid fuel composite 32a may be a mixture of solid, carbonaceous fuel and a solid reagent. As an example, the solid reagent may be a substance that is active within the heating zone 26 but is not directly involved in the primary reaction of the fuel. For instance, the reagent may be a sorbent, such as calcium carbonate (e.g., limestone), for absorbing product compounds from the reaction (e.g., sulfur compounds), which facilitates an efficient reaction process.

The solid fuel composite 32a may be made up of particles of the fuel and reagent. Individual particles may include both the fuel and the reagent, which promotes absorption of undesired product compounds (e.g., sulfur products) through the dispersion of the reagent. The particles may have an average particle size of less than 500 micrometers. In a further example, the average particles size may be less than 200 micrometers and, in other examples, less than 100 micrometers. In one example, the average particle size may be approximately 78 micrometers. A relatively small particle size facilitates uniform dispersion between the fuel and reagent, and also helps in eluting the particles through the larger particles of the inert bed material.

The fuel may be any type of solid, carbonaceous fuel that is suitable for supporting the reaction within the reactor 22. As an example, the solid, carbonaceous fuel may be a biomass, petcoke, coal, or combinations thereof. The fuel may also include sulphur as an impurity, which is removed by the calcium carbonate reagent during the reaction. In some examples, a high carbon-content fuel, such as petcoke, may be desired to facilitate achievement of efficient operation of the reactor system 20.

The reactor 22 generally includes an injection port 22a through which oxygen (e.g., air, air/recycled flue gas mix, etc.) from the oxygen supply 30 is provided to the heating zone 26, and a discharge port 22b through which exhaust products, such as product gas and any entrained particles (e.g., spent sorbent), are discharged. The reactor 22 may also include other ports, such as fuel injection port 22c for providing the solid fuel composite 32a from the fuel supply 32 to injectors near the heating zone 26.

The discharge port 22b may be connected to a downstream device 34 for further processing the exhaust products. For example, the downstream device 34 may include a scrubber for separating solids from the exhaust product or preparing the exhaust gas for a downstream use, such as enhanced oil recovery or enhanced coal bed methane production or sequestration. A heat exchanger 36 may be provided to transfer heat from the exhaust product into a recycle stream 38 that is received back into the supply of oxygen.

In this example, the heat exchanger 28 is in thermal communication with a device 40, such as a steam-turbine powered electric generator or Brayton cycle electric generator. Alternatively, the device 40 may be another type of device for receiving heat from the heat exchanger 28, such as a supercritical carbon dioxide turbine. A second device 42 may be arranged in thermal communication with the first device 40 to receive heat therefrom. As an example, the device 40 may be a supercritical carbon dioxide turbine and the device 42 may be a steam-powered electric generator, a further example of which will be described below.

The fluidized-bed 24 of the reactor 22 may be made up of the loose particles of inert bed material 24a, which do not chemically participate in the reaction within the heating zone 26. The inert bed material 24a may be a ceramic material, such as alumina, zirconia, chromia, or combinations thereof. The inert bed material may contain only the ceramic material such that it is substantially free of any other materials. Given this disclosure, one of ordinary skill in the art may also recognize other ceramic materials that are substantially unreactive under the combustion conditions within the reactor 22 that may alternatively be used.

Alternatively, an active material may be disposed on the inert bed material. The active material may be a catalyst (e.g., platinum or platinum alloy), a sorbent, or combinations thereof, which participate in the chemical reaction. For instance, a catalyst may be loaded on the particles of the inert bed material in an amount up to approximately 10 wt %.

The loose particles of the inert bed material 24a may have an average particle size that is 500-2000 micrometers. In a further example, the average particle size may be 1000-1500 micrometers. Generally, a particle size of approximately 1000-1500 micrometers facilitates forming the fluidized-bed 24, uniformly mixing the reactants within the heating zone 26, and uniformly transferring heat through the heating zone 26. Additionally, the disclosed average particle size is also larger than the average particle size of the solid fuel composite 32a, which allows the particles of the solid fuel composite 32a to elute through the interstices between the loose particles of the inert bed material 24a. The loose particles of the inert bed material 24a also operate to slow the velocity of the reactants in the heating zone 26, which facilitates reduction of mechanical wear within the reactor 22.

In operation, the reactor 22 may be pressurized to above ambient pressure, such as approximately 120 pounds per square inch. In this regard, the reactor 22 is an oxygen-blown/pressurized fluidized-bed reactor. In other examples, however, the reactor may be operated at nominally atmospheric pressure. The oxygen supply 30 injects oxygen gas into the heating zone 26 of the reactor 22 and the fuel supply 32 injects the solid fuel composite 32a into the heating zone 26. The solid fuel composite 32a reacts with the oxygen to release heat that the loose particles of the inert bed material 24a distribute through the heating zone 26. The loose particles of the inert bed material 24a help transfer the heat into the heat-exchanging portion 28a of the heat exchanger 28. For example, the heat exchanger 28 may carry supercritical carbon dioxide as the heat-exchanging fluid, although a mixture of supercritical carbon dioxide/helium or water may alternatively be used. The heat exchanger carries the heated heat-exchanging fluid outside of the reactor 22 to the device 40, where the heated heat-exchanging fluid may be used to generate electric power or for other purposes. In modified examples, a solar thermal concentrating system or a nuclear reactor may replace the reactor 22 as the heat source.

Figure 2:
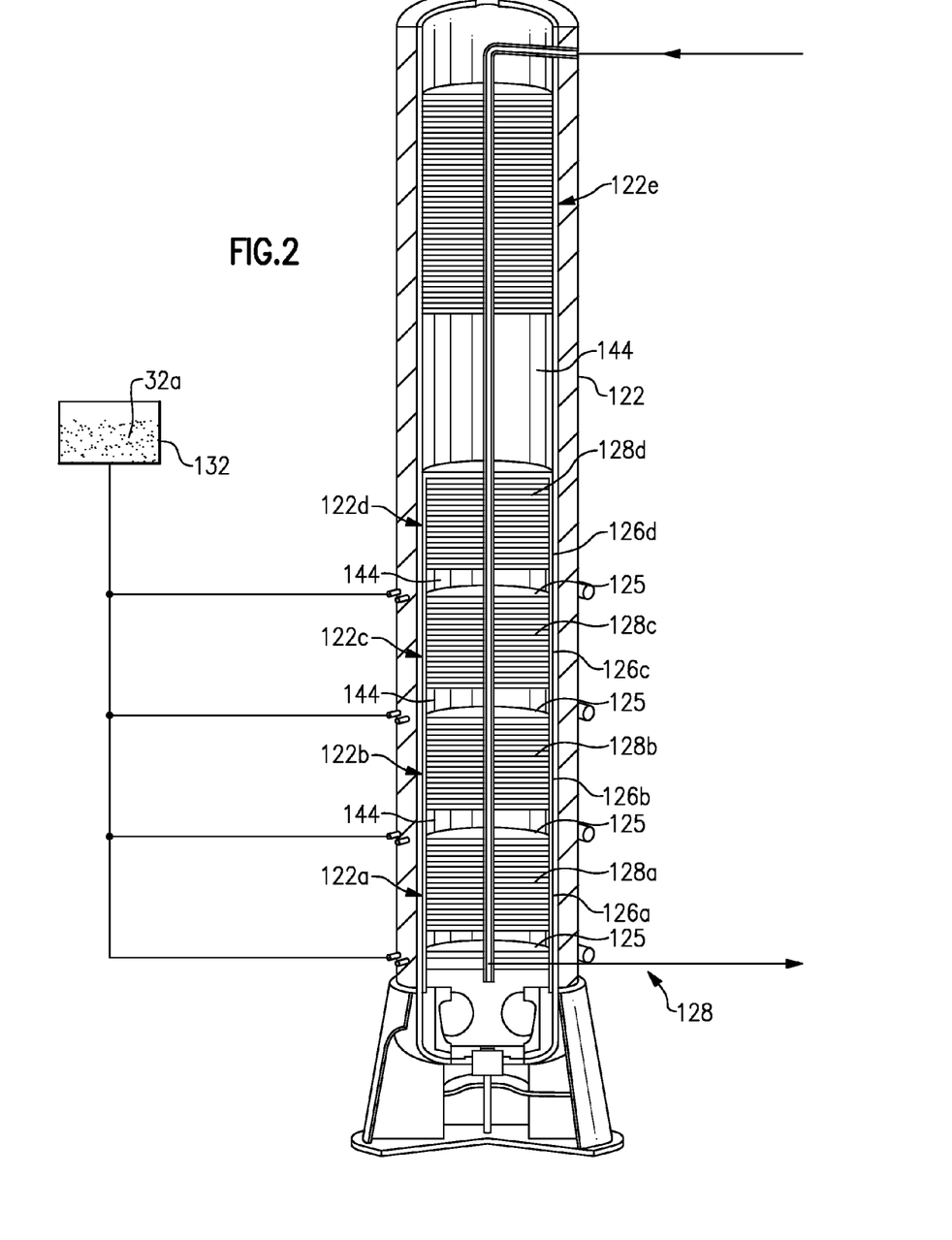
FIG. 2 illustrates an example reactor.

FIG. 2 illustrates another example reactor 122 that may be used within the reactor system 20. In this disclosure, like reference numerals designate like elements where appropriate and reference numerals with the addition of one-hundred or multiples thereof designate modified elements that are understood to incorporate the same features and benefits of the corresponding original elements. In this example, the reactor 122 includes multiple stages 122a-d that are axially spaced apart with a freeboard section 144 between each of the stages 122a-d. In this case, each of the stages 122a-d includes a corresponding heating zone 126a-d and corresponding heat-exchanging portion 128a-d. An additional stage 122e is located above the stages 122a-d with a larger freeboard section 144 between the stage 122e and the stage 122d.

In operation, the use of the multiple stages 122a-d, or elevations, provides the ability for greater control over the reaction and temperatures within the reactor 122. For instance, the solid fuel composite 32a or other type of fuel may be injected at each stage 122a-d through fuel injectors 125 rather than all at one location, which could otherwise produce a spike in temperature. The oxygen may be injected all at the bottom of the reactor 122. By injecting the fuel at the spaced apart stages 122a-d, the heat can be more efficiently removed in each heating zone 126a-d and the reaction volume can be controlled to preclude reducing gas zones that accelerate corrosion. Moreover, injecting the fuel at the spaced apart stages 122a-d enables stoichiometric combustion of oxygen, at least in the uppermost stage 122d. Thus, injecting the fuel at the spaced apart stages 122a-d facilitates achievement of efficient combustion and maintenance of temperatures to be below a desired threshold. Maintaining the temperature below a desired threshold helps avoid high temperatures that could otherwise result in production of combustion salt products or agglomerates that could destabilize the fluidized-bed.

Figure 3A:
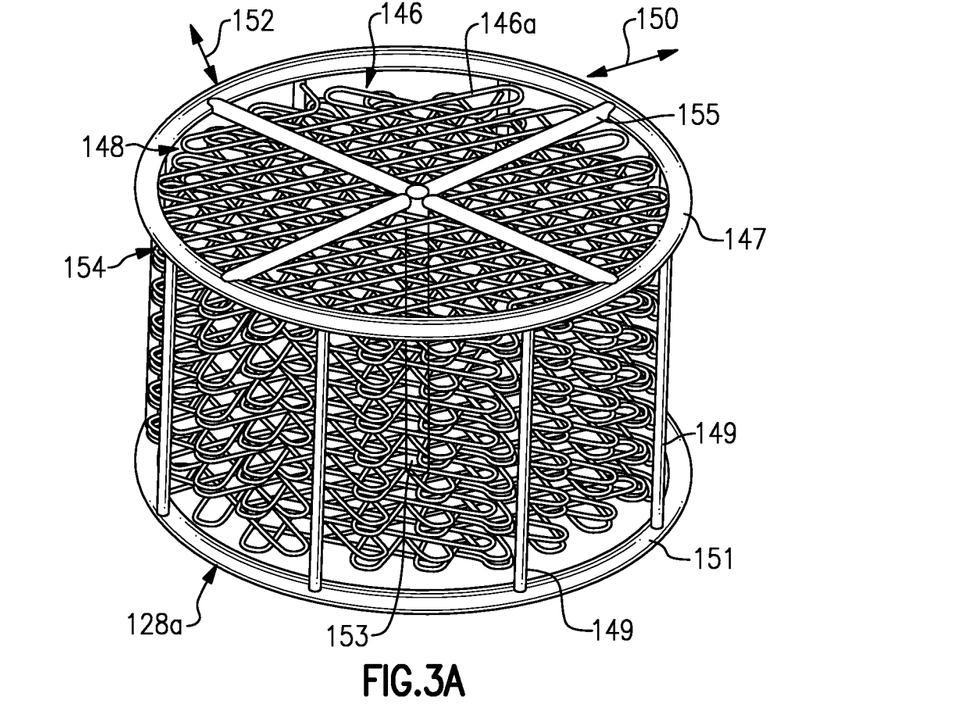
FIG. 3A illustrates a perspective view of a heat-exchanging portion.
Figure 3B:
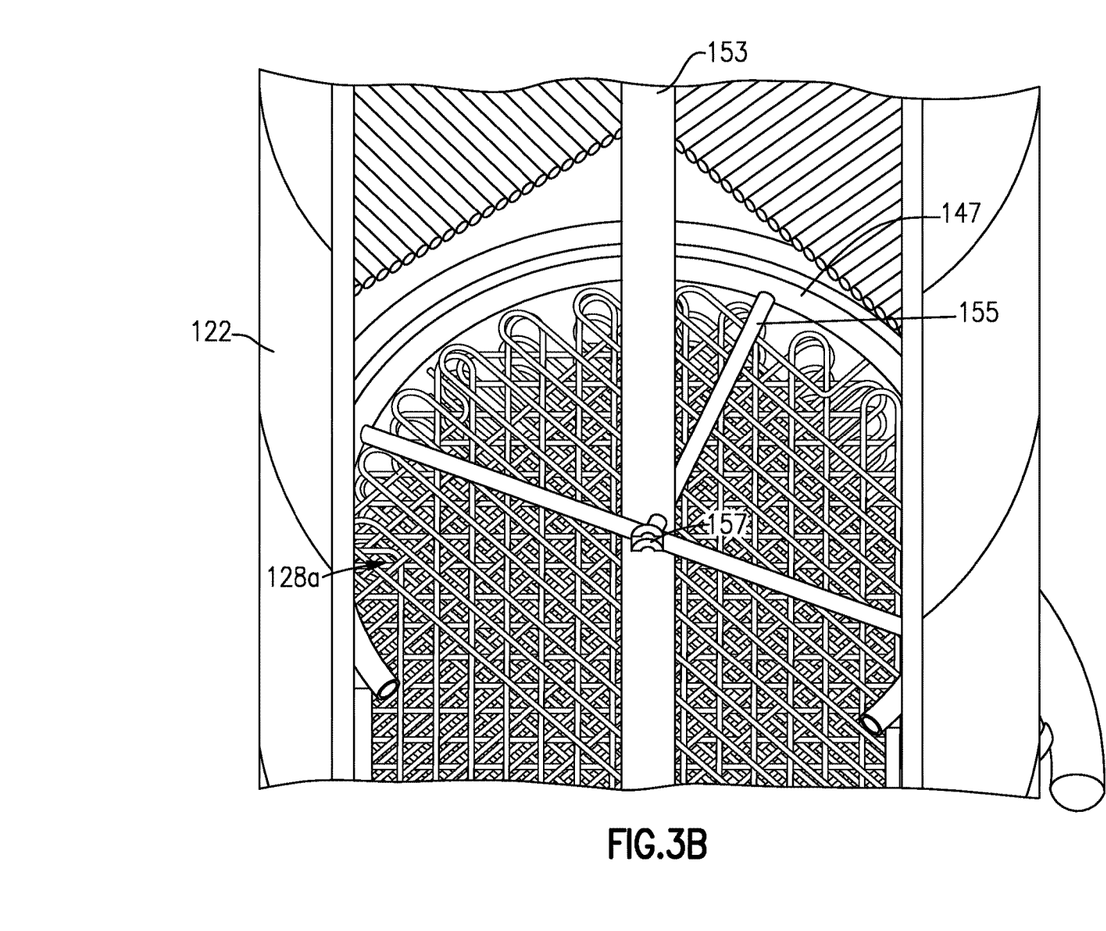
FIG. 3B illustrates a cutaway view of the heat-exchanging portion of FIG. 3A.
Figure 3C:
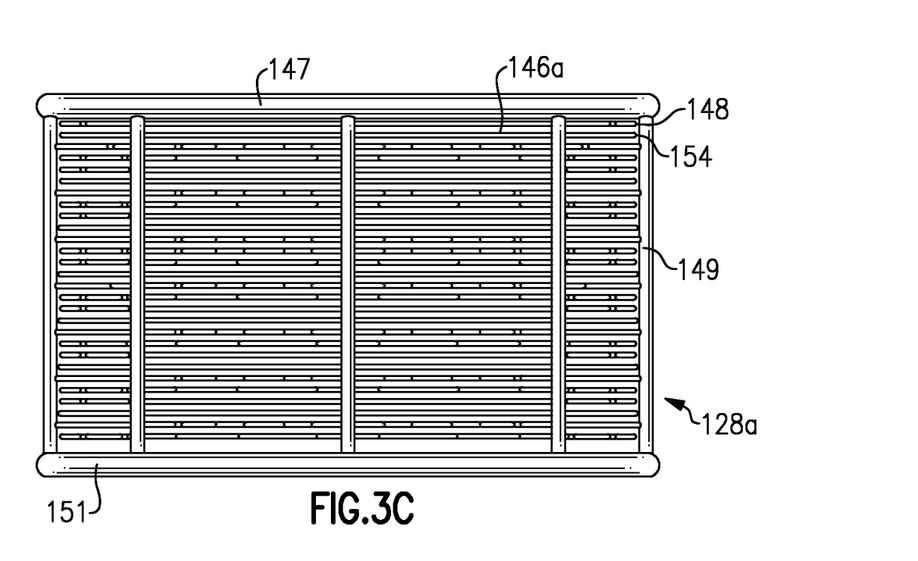
FIG. 3C illustrates a side view heat-exchanging portion of FIG. 3A.

FIGS. 3A-C illustrate the heat exchanging portion 128a of the heat exchanger 128 from FIG. 2. The heat-exchanging portions 128b-e may be substantially similar. In this example, the heat-exchanging portion 128a includes a three-dimensional arrangement 146 of tubes 146a through which the heat-exchanging fluid flows to absorb heat from the heating zone 126a. As illustrated in the side view of the heat-exchanging portion 128a in FIG. 3C, the tubes 146a of the arrangement 146 may be arranged such that there are multiple vertical "layers" of tubes 146a. A top "layer" of the tubes 146a loops back and forth horizontally in a top plane 148. The tubes 146a in this top plane 148 generally extend back and forth along a first direction 150 (FIG. 3A) that is transverse to a direction 152 along which the tubes 146a extend in a neighboring plane 154. That is, each layer of the tubes 146a is oriented at a different angle than the neighboring layers of tubes 146a. The three dimensional arrangement 146 thereby facilitates uniformly transferring heat to the heat exchanging portion 128a. Further, the arrangement 146 serves as a grid or baffle to facilitate distribution of the loose particles of inert bed material 24a and reactants within the heating zone 126a.

An annular supply tube 147 is arranged around the top periphery of the arrangement 146 for providing the tubes 146a of the top plane 148 with the heat-exchanging fluid. The heat-exchanging fluid flows through the tubes 146a of the top plane 148, into downcomer tubes 149 that extend vertically from the annular supply tube 147, into the tubes 146*a* of the next lower plane 154, and so on and so forth. Another annular tube 151 may be provided at the bottom of the tube layers for distributing the heat-exchanging fluid to a main tube 153 to supply the heat-exchanging fluid to another heat-exchanging portion or to transfer the fluid outside of the reactor 122.

At the top of the arrangement 146, the main tube 153 connects to radial tubes 155 to distribute the heat-exchanging fluid to the annular supply tube 147. A plug 157 (FIG. 3B) may be provided within the main tube 153 beyond the openings to the radial tubes 155 to force the flow of the heat-exchanging fluid into the radial tubes 155.

FIGS. 4A-D and 5A-D illustrate alternative three dimensional tube arrangements 246 and 346, respectively, that they may be used within the reactor 122. In the arrangement 246, the main tube 253 connects to a cross-tube 257*a* that functions as a manifold tube to provide heat-exchanging fluid to sets 259*a* of looped tubes. The sets 259*a* discharge the fluid into cross-tubes 257*b* from which the fluid flows into sets 259*b* of looped tubes. The tubes 246*a* in the sets 259*a* and 259*b* loop vertically up and down through the heating zone 126*a*.

Figure 4A:
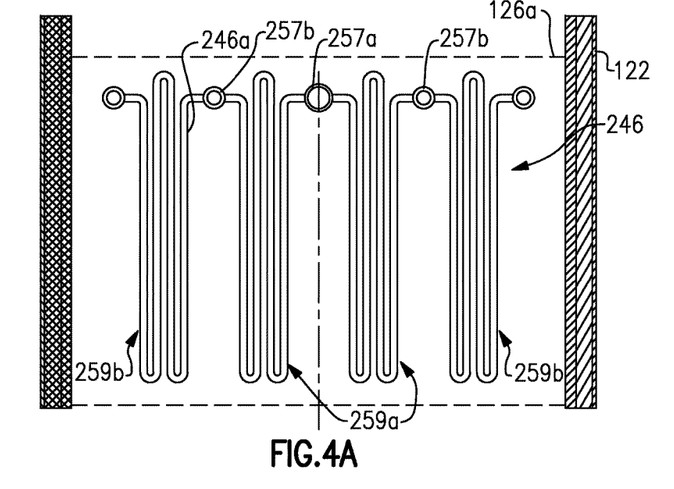
FIG. 4A illustrates a side view of an example heat-exchanging portion.
Figure 4B:
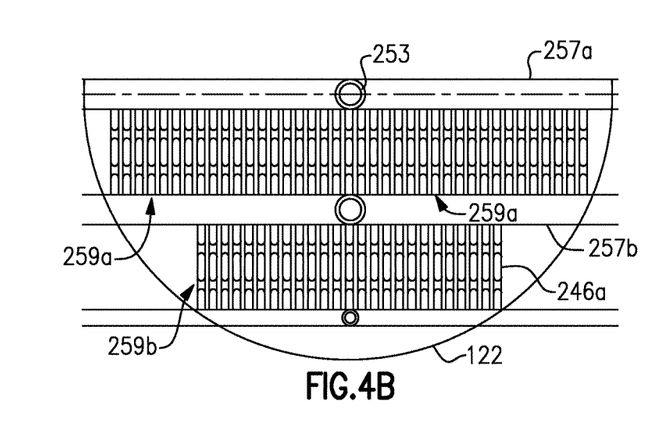
FIG. 4B illustrates a top view of the heat-exchanging portion of FIG. 4A.
Figure 4C:
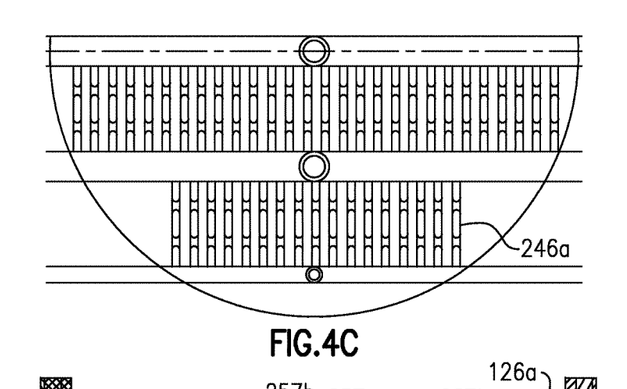
FIG. 4C illustrates a top view of a heat-exchanging portion having a different tube density.
Figure 4D:
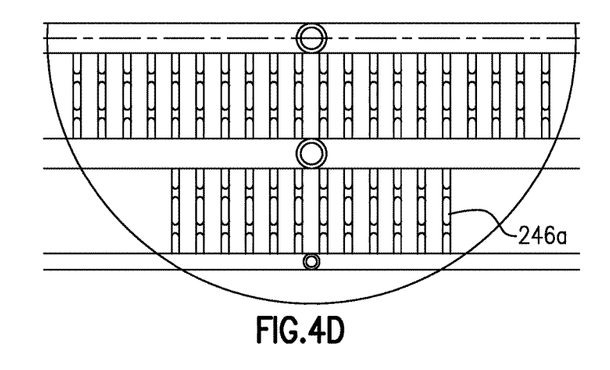
FIG. 4D illustrates a top view of another heat-exchanging portion having a different tube density.

FIG. 4B illustrates a view from the top of the tubes 246*a* showing a tube density of a number of tubes per volume. That is, the tubes 246*a* are packed together relatively tightly in the bottom zone or stage 122*a* where the temperature is greatest within the reactor 122. Other stages 122*b-e* may have a different tube density (per volume of the heating zone 126*a*), such as that shown in FIG. 5C or FIG. 5D, where the tubes 246*a* are not packed as closely together. In the disclosed examples, the tube densities are 126, 90, and 60 tubes per volume of the heating zone 126*a* in FIGS. 4B, 4C, and 4D, respectively.

Figure 5A:
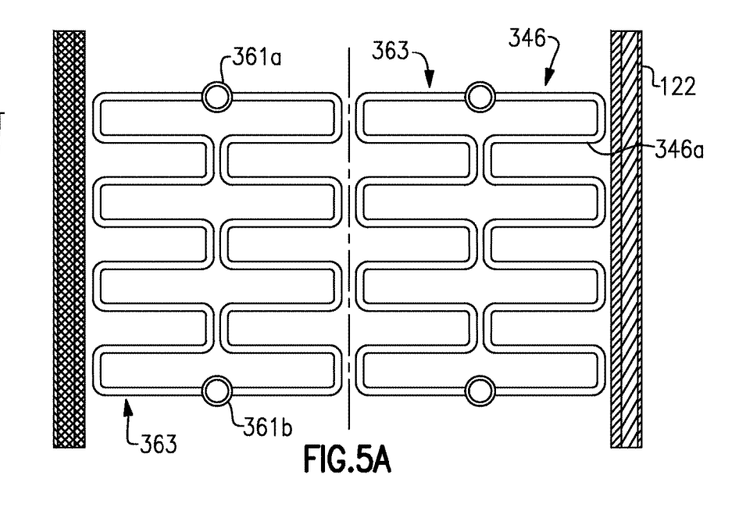
FIG. 5A illustrates a side view of an example heat-exchanging portion.
Figure 5B:
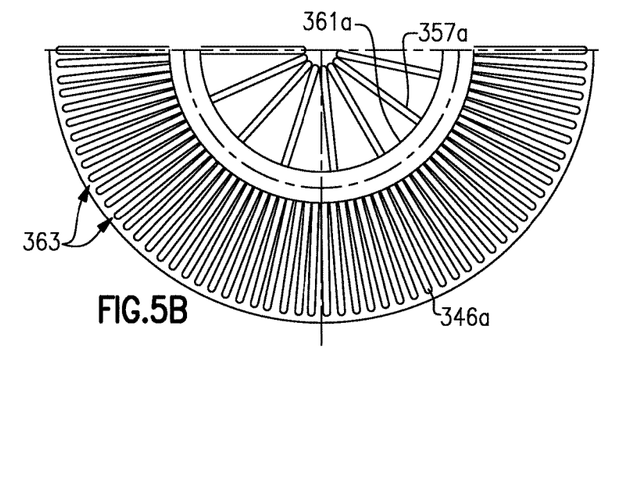
FIG. 5B illustrates a top view of the heat-exchanging portion of FIG. 4A.
Figure 5C:
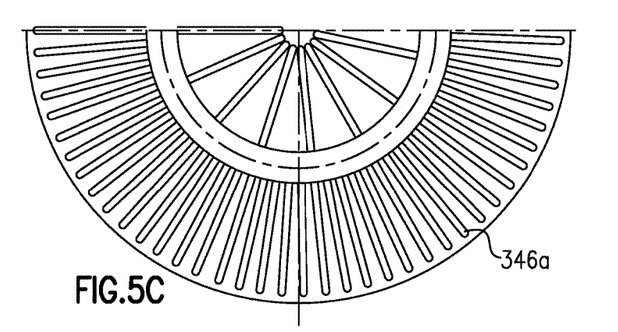
FIG. 5C illustrates a top view of a heat-exchanging portion having a different tube density.
Figure 5D:
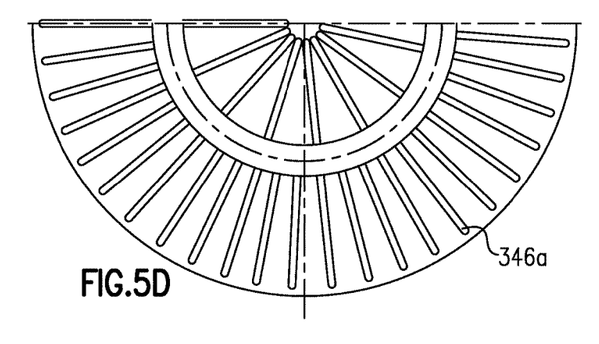
FIG. 5D illustrates a top view of another heat-exchanging portion having a different tube density.

The tubes 346*a* of the three dimensional arrangement 346 in FIGS. 5A-D loop up and down in a different pattern than in FIGS. 4A-D. In this case, the tubes 346*a* are arranged radially in a "clock" type of pattern. FIGS. 5C and 5D illustrate the same type of arrangement but with a lower tube density than shown in FIG. 5B. In the disclosed examples, the tube densities are 126, 90, and 60 tubes per volume of the heating zone 126*a* in FIGS. 5B, 5C, and 5D, respectively.

In the arrangement 346, the main tube 353 connects to radial tubes 357*a* that provide heat-exchanging fluid to annular tube 361*a*. The annular tube 361*a* connects to tube sets 363. The tubes 346*a* of the sets 363 wind in a serpentine pattern downward to annular tube 361*b*, which discharges back into the main tube 353.

Figure 6:
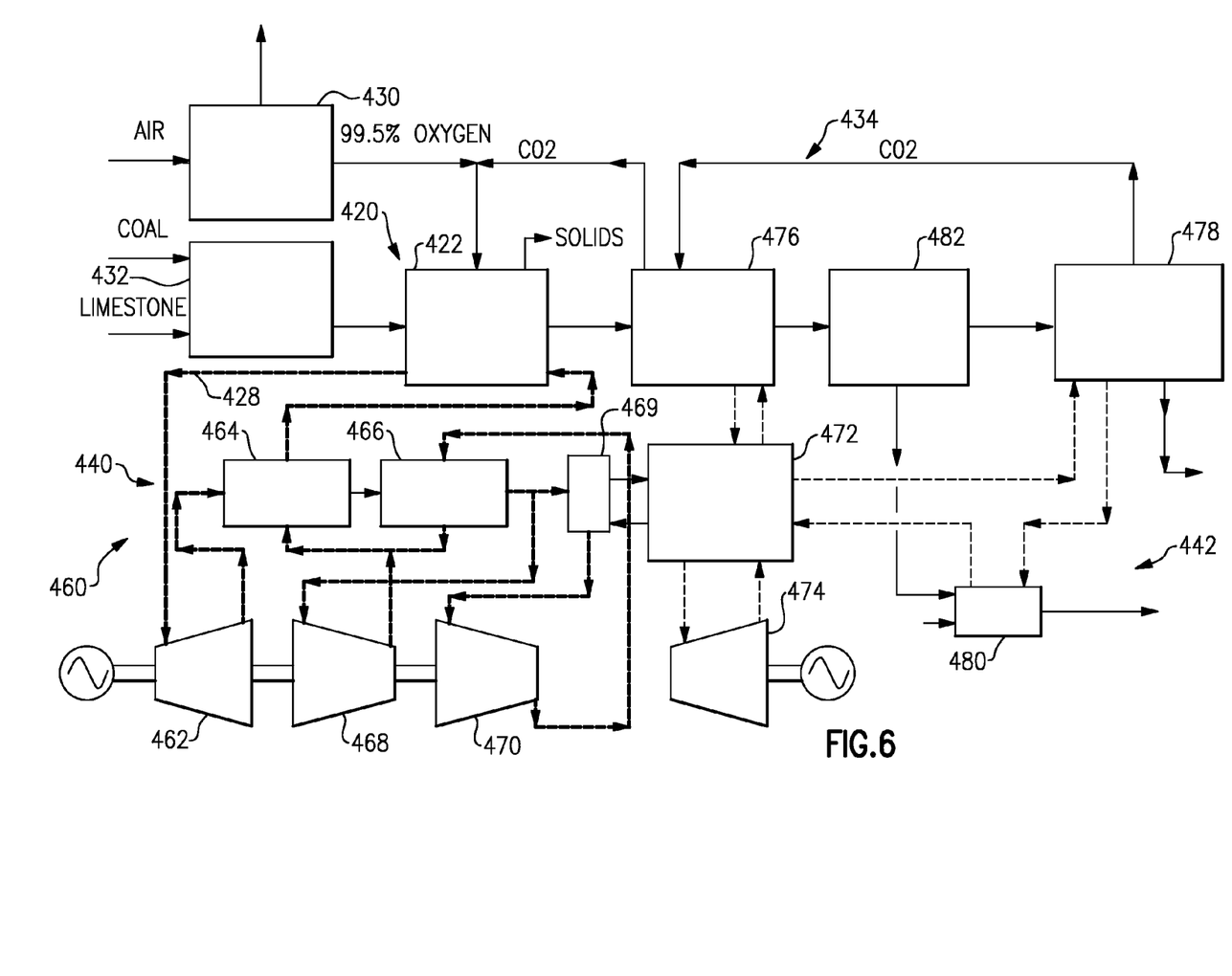
FIG. 6 illustrates an example power generator system incorporating a reactor system.

FIG. 6 illustrates selected portions of an example power generator system 460 that incorporates a reactor system 420 that is similar to the reactor system 20 as described above. In this case, several components of the device 434, the device 440, and the device 442 are shown. The device 440 is a supercritical carbon dioxide turbine and the device 442 is a steam-turbine powered electric generator. The device 440 is in thermal communication with the heat exchanger 428 (as illustrated by the dashed lines) to drive a turbine 462 in a known manner. The supercritical carbon dioxide fluid may then be transferred to a high temperature recuperator 464 and low temperature recuperator 466 as well as a recycle compressor 468 and main compressor 470. Heat from the supercritical carbon dioxide is transferred from a cooler 469 within the device 440 to the device 442.

The device 442 may include a power steam cycle 472 that provides steam to a steam turbine 474 for producing electric energy in a known manner. The steam power cycle 472 may further be in thermal communication with a heat recovery system 476 of the device 434 and a heat recovery, purification, and compression system 478 of the device 434, as well as a cooler 480 that receives separated solids from a filtration device 482.

In the disclosed arrangement, the supercritical carbon dioxide fluid, which is heated in the reactor 422, is considered to be an intermediate working fluid that is used to heat water to produce the steam for the device 442. That is, unlike known power generators, the working fluid, in addition to driving the supercritical carbon dioxide turbine 462, provides heat to a secondary working fluid (water) to ultimately drive the steam turbine 474. In this manner, the heat energy produced in the reactor 422 may be efficiently used.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:
1. A power generator system comprising:
   a fluidized-bed reactor having a height substantially greater than diameter, the fluidized bed including a plurality of axially spaced apart heating zones permitting separate injection of fuel thereto, each heating zone having resident loose particles therein and being operable to generate heat in a fluidized bed of the resident loose particles;
   a heat exchanger carrying supercritical carbon dioxide and having a heat-exchanging portion within the fluidized bed of each of the plurality of heating zones and that is hermetically sealed from the plurality of heating zones, the heat-exchanging portion comprising a main supply tube centrally located within and perpendicular to a plurality of horizontal layers of tubing each spaced apart from an adjacent horizontal layer of tubing, wherein each of the horizontal layers of tubing is oriented at an acute angle angled to the adjacent horizontal layer of tubing; and
   a steam-powered electric generator in thermal communication with the heat exchanger.
2. A power generator system comprising:
   a fluidized-bed reactor having a height substantially greater than diameter, the fluidized bed including a plurality of axially spaced apart heating zones permitting separate injection of fuel thereto, each heating zone having resident loose particles therein and being operable to generate heat in a fluidized bed of the resident loose particles;
   a heat exchanger carrying supercritical carbon dioxide and having a heat-exchanging portion within the fluidized bed of each of the plurality of heating zones, the heat-exchanging portion including a three-dimensional tube arrangement including a plurality of spaced apart tubing layers and configured to distribute the resident loose particles through the fluidized bed to facilitate uniform transfer of the heat to the heat-exchanging portion; and a steam-powered electric generator in thermal communication with the heat exchanger.

3. The power generator system as recited in claim 2, wherein the fluidized-bed reactor is an oxygen-blown/pressurized fluidized-bed reactor that includes loose particles of an inert bed material for forming the fluidized bed.

4. The power generator system as recited in claim 2, further comprising a feed system that includes a solid fuel composite.

5. The power generator system as recited in claim 2, further comprising a supercritical carbon dioxide turbine in thermal communication with the heat exchanger.

6. The power generator system as recited in claim 2, wherein the fluidized-bed reactor is a reactor operable to be pressurized above ambient pressure.

7. The power generator system as recited in claim 2, wherein the fluidized-bed reactor includes a reactor chamber and the heat-exchanging portion extends within the reactor chamber.

8. The power generator system as recited in claim 2, wherein the three-dimensional tube arrangement comprises an annular supply tube.

9. The power generator system as recited in claim 2, wherein the three-dimensional tube arrangement comprises downcomer tubes extending from the annular tube.

10. The power generator system as recited in claim 2, wherein the three-dimensional tube arrangement comprises radial tubes extending radially from the annular tube.

11. The power generator system as recited in claim 2, wherein the three-dimensional tube arrangement comprises tube layers each having a tube orientation direction, and the orientation direction of each layer is transverse to the tube orientation direction of the neighboring tube layers.

12. The power generator system as recited in claim 2, wherein the three-dimensional tube arrangement comprises vertical tube loops.

13. The power generator system as recited in claim 2, wherein the heat-exchanger includes at least one additional heat-exchanging portion, each heat-exchanging portion having a heat exchanger tube density of a number of tubes per volume, and the heat exchanger tube densities of the heat-exchanging portions are different.

14. The power generator system as recited in claim 2, wherein the three-dimensional tube arrangement is a grid.

15. The power generator system as recited in claim 2, wherein the three-dimensional tube arrangement is configured as a baffle.

16. The power generator system as recited in claim 2, wherein the resident loose particles are inert with respect to a combustion reaction within the fluidized-bed reactor.

17. The power generator system as recited in claim 16, wherein the resident loose particles are selected from the group consisting of alumina, chromia, zirconia and combinations thereof.

18. The power generator system as recited in claim 16, wherein the resident loose particles have an average particle size of 500-2000 micrometers.

19. The power generator system as recited in claim 18, wherein the average particle size is 1000-1500 micrometers.

20. The power generator system as recited in claim 2, wherein the resident loose particles are coated with a catalyst material.

21. The power generator system as recited in claim 2, wherein the plurality of spaced apart tubing layers comprises a plurality of horizontal layers of tubing each spaced apart from an adjacent horizontal layer of tubing.

22. The power generator system as recited in claim 21, wherein each of the horizontal layers of tubing is oriented at an acute angle to the adjacent horizontal layer of tubing.

* * * * *